3,248,846
MACHINE FOR SECTIONING AND INSERTING FILM FRAMES INTO APERTURE CARDS
Stanley Engelstein, 320 West End Ave., New York, N.Y.
Filed Feb. 11, 1963, Ser. No. 257,479
6 Claims. (Cl. 53—123)

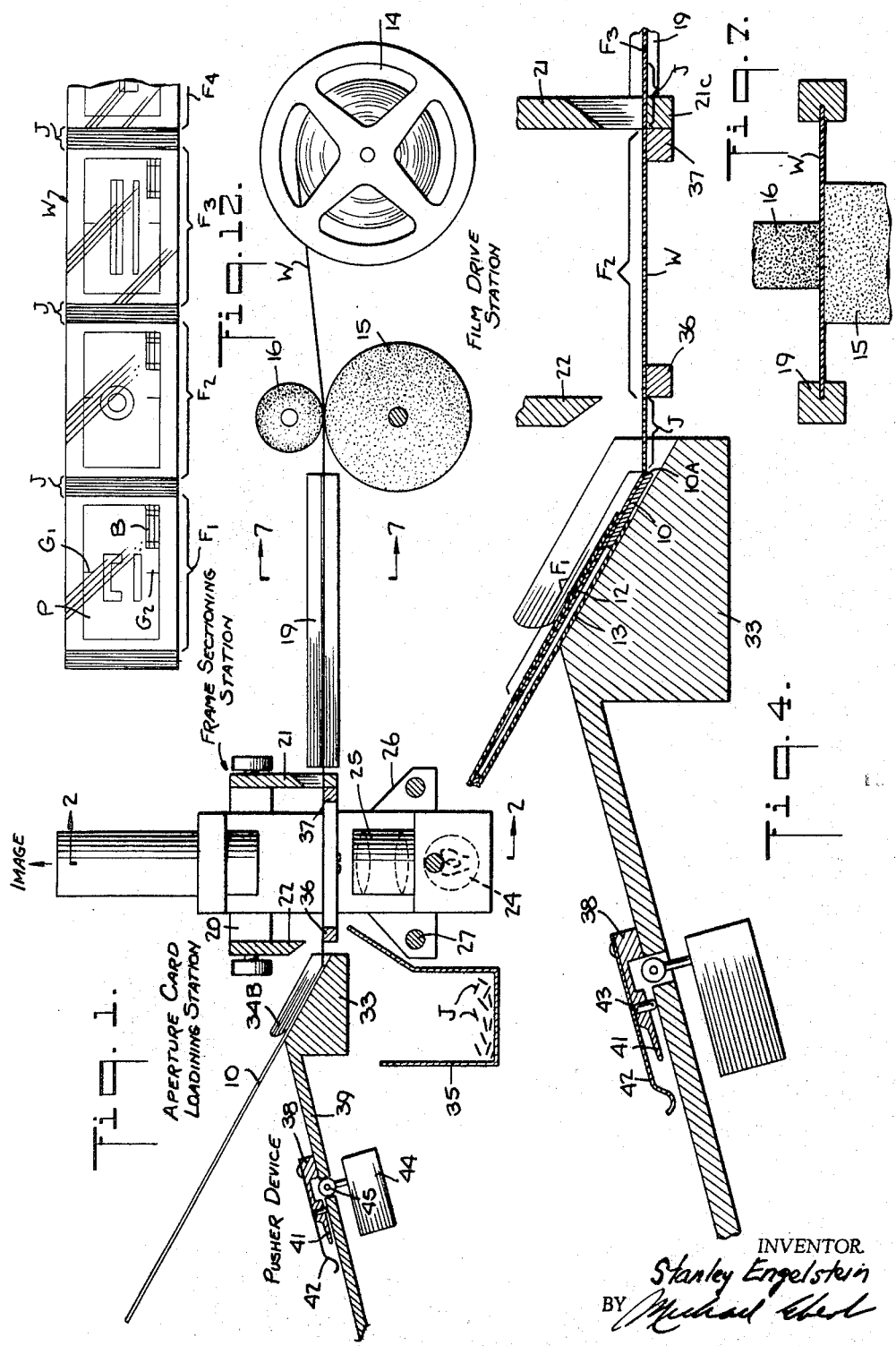

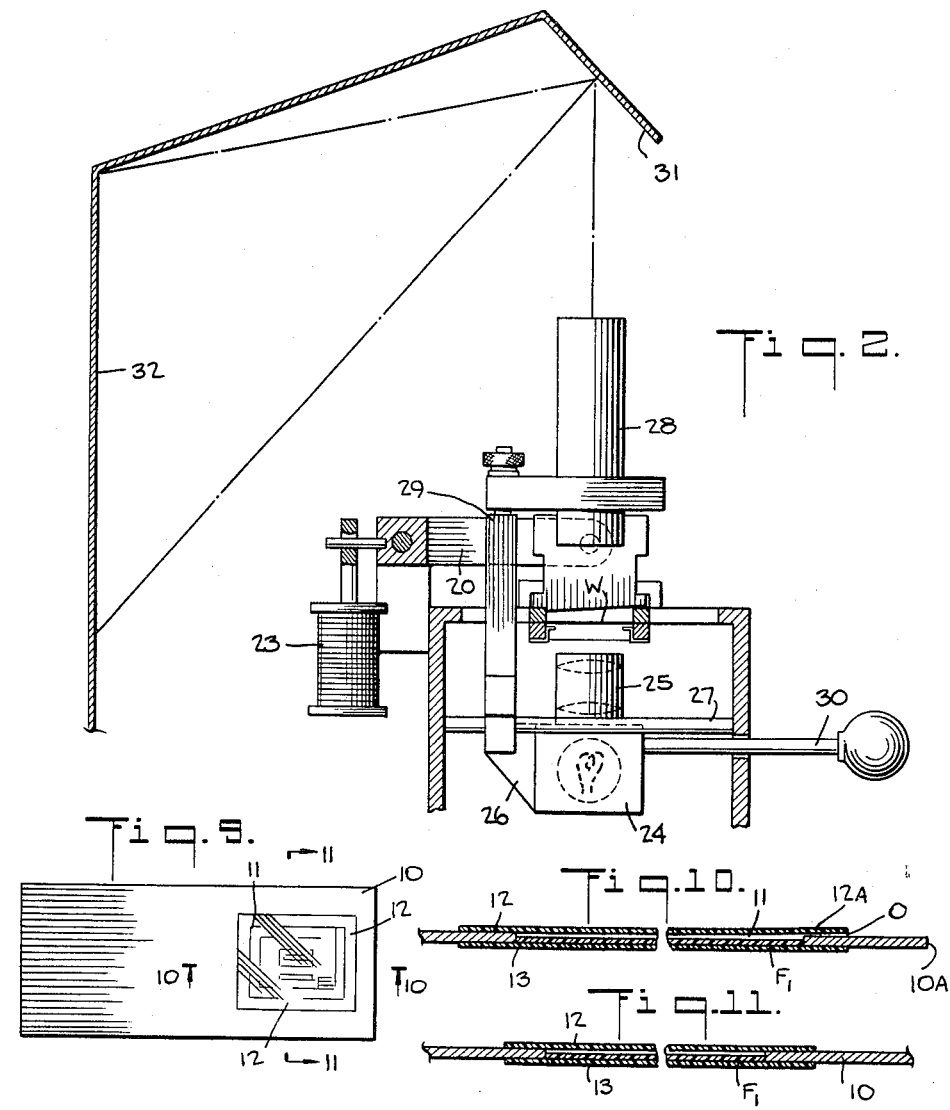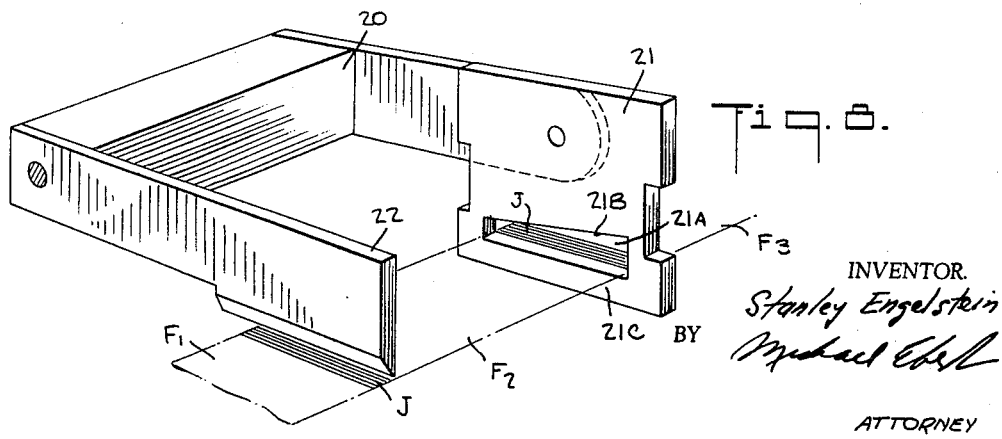

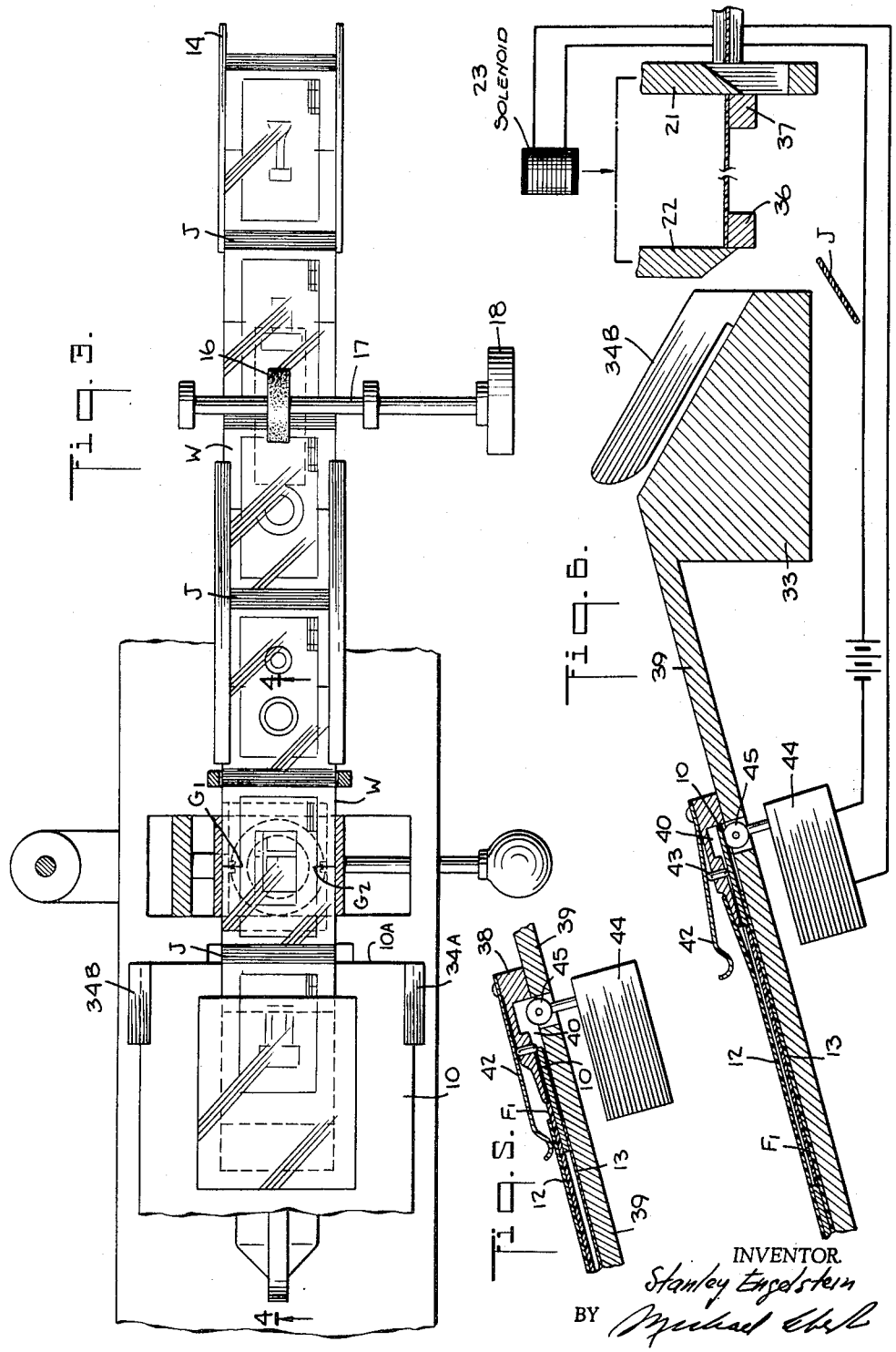

This invention relates generally to apparatus for cutting a microfilm web into individual frames which are inserted into protective housings, and more particularly to a machine adapted to section the film to a frame size suitable for an aperture card of the suspension type and for inserting the frame fully therein.

In the handling of data such as records, drawings and other documentary material, it is the modern practice to photograph each item of data on a reduced scale or microfilm. The use of microfilm conserves storage space and facilitates the transmission and retrieval of data.

When in roll form, ready access cannot be had to specific microfilm frames, and for this reason the film is sectioned into individual frames for mounting in so-called "aperture cards." These cards are provided with printed indicia in alpha-numeric form, or with punch-coded symbols identifying the frame mounted in the aperature thereof. The loaded aperture cards are filed and indexed so that when a call arises for a particular record, the appropriate card may be quickly located and placed in an optical reader for projecting the microfilm frame mounted therein. The retrieval of data may also be carried out by data processing techniques which sense the code symbols to select a desired card.

The present invention is concerned with the problem of sectioning a microfilm web into individual slides, transparencies or frames of a predetermined size and inserting the frames into the aperture of a card of the suspension type, the entire operation to be carried out quickly and efficiently, and without smudging or scratching the film. In aperture cards of this type, a transparent jacket or chamber is formed by a pair of transparent panels which overlie the aperture on either face of the card, the borders of the panels being bonded to the surrounding edges of the aperture except at one side, to give access to the chamber. One preferred form of aperture card of the suspension type is disclosed in my co-pending application entitled "Suspension-Type Aperture Card," Serial No. 254,709, filed January 29, 1963.

Accordingly, it is the main object of this invention to provide a machine adapted to section a microfilm web into individual frames and to insert each frame into an aperture card of the suspension type, the sectioning acting to remove a surplus junction area on the web between adjacent frames whereby the frame dimensions correspond precisely to the dimensions of the aperture.

A significant feature of the invention resides in the combination of an optical reader with the sectioning mechanism to permit the operator not only to align each frame correctly with respect to fore and aft sectioning blades, but also to check the identity of the frame and thereby verify matching of the film information with the information on the aperture card prior to insertion therein. Should such verification be carried out by inspection after insertion, and a mismatch discovered, difficulties will arise, for it then becomes necessary carefully to remove the frame without mutilating either the frame or the card.

Also an object of the invention is to provide a machine of the above type which combines a sectioning station with a card-loading station, wherein after a frame is sectioned to its exact length, the frame is thrust forwardly by the leading edge of the uncut film web when the web is advanced until the next frame occupies the proper position at the sectioning station, the forward movement of the sectioned frame causing it partially to enter the aperture compartment of the card.

Still another object of the invention is to provide a pusher device which is adapted to complete the insertion of the film frame into the aperture compartment in a positive, scratch-free manner. Another salient aspect of the invention resides in a pusher device whose operation is coordinated with the control circuit of the sectioning station, whereby the sectioning action can only occur when a card is inserted in the pusher device. In this way inadvertent operation is avoided.

Also an object of the invention is to provide a cutting mechanism for the film including a blade element having a segment disposed below the film web which functions as a track section when the blade thereof is raised over the film so that no gap exists in the film trackway which would interfere with the advance of the film.

Briefly stated, these objects are accomplished in a machine including a drive station adapted to move a microfilm web into a sectioning station where an individual frame is cut therefrom to an exact length, which frame is thrust by a further advance of the web partially into the aperture compartment of a card supported on a platform at an insertion station, the advance of the web serving to align the next frame for sectioning and at the same time to push the previously cut frame so that its leading edge lies within the compartment and its trailing edge lies outside thereof.

The partially loaded aperture card is then transferred to a pusher device and is inserted therein, whereby a tongue on the device engaging the trailing edge of the frame acts to push the frame fully into the compartment and at the same time a switch engaged by the inserted card effects actuation of the blades at the sectioning station.

Thus loading of the card is accomplished by the machine in two simple steps, the first step being the advance of the uncut web to a position which lines up a frame with fore and aft blades in the sectioning station and simultaneously pushes the previously cut frame partially into the aperture compartment of the card at the loading station, the second step being the transfer of the card and its insertion in the pusher device to complete the insertion and at the same time to actuate the blades at the sectioning station. At the sectioning station, an optical view is provided which permits inspection of the frame therein to facilitate its alignment and to vertify its identity as against the aperture card to be loaded therewith.

For a better understanding of the invention, as well as other objects and further features thereof, reference is made to the following detailed description to be read in conjunction with the accompanying drawings, wherein:

FIG. 1 is a longitudinal section taken through a machine for sectioning a microfilm strip into individual frames and for inserting each frame into an aperture card;

FIG. 2 is a transverse section taken in the plane indicated by line 2—2 of FIG. 1;

FIG. 3 is a plan view of the machine shown in FIG. 1;

FIG. 4 is an enlarged longitudinal section taken along the same plane as that in FIG. 1, but limited to the area indicated by lines 4—4 of FIG. 3, the operation shown being that of a slide being partially inserted in the aperture card;

FIG. 5 is a section showing only the pusher device of the machine wherein the partially inserted slide is fully thrust into the aperture card;

FIG. 6 is similar to FIG. 4, except that in this instance the aperture card is in the pusher device of the machine, thereby causing actuation of the frame slicing blades in the frame sectioning station of the machine;

FIG. 7 is a transverse section taken along the plane indicated by lines 7—7 of FIG. 1;

FIG. 8 is a perspective view of the blade cradle in the sectioning station of the machine;

FIG. 9 is a plan view of an aperture card of the suspension type;

FIG. 10 is a section taken in the plane indicated by lines 10—10 in FIG. 9;

FIG. 11 is a section taken in the plane indicated by lines 11—11 in FIG. 9; and

FIG. 12 is a plan view of an unsectioned microfilm strip.

*Aperture cards*

Referring now to the drawings, before describing the structure and function of the machine, we shall first consider the problem involved with reference to a sample aperture card to be loaded with individual microfilm transparency frames appearing along a continuous web W, a portion of the web being shown in FIG. 12. Each item of photographic data is contained within a separate image frame, frames $F_1$, $F_2$ and $F_3$ being illustrated. Considering the photograph P appearing within frame $F_1$, it will be seen that the photograph is that of a machine part drawing which includes an identifying block B.

Also on the photograph are a pair of center guide lines $G_1$ and $G_2$ whose purpose is to facilitate sectioning of the frame. Between successive image frames there is a junction area J. The first point to be borne in mind is that it is not sufficient in separating the frames simply to cut between adjacent frames, for it is also necessary to dispose of the junction areas J, as the apertures in the cards can only accommodate the frames, and these junction areas constitute surplus.

Considering now the sample aperture card shown in FIGS. 9, 10 and 11, this is constituted by a standard card 10 designed for use in commercially available filing systems and in punched card classifying and sorting machines. The card may be provided with printed indicia or with a row of punches or other coded symbols identifying the film slide $F_1$ to be mounted in the rectangular card aperture 11. The aperture is covered on each face of the card by a top panel 12 and a bottom panel 13.

The rectangular panels are both formed of transparent, flexible plastic material, such as cellulose acetate, or polyester films, such as Mylar, and are larger than the aperture dimensions, thereby providing borders which surround the edges of the aperture and are adhered thereto to form an enclosed chamber or compartment for suspending the frame within the aperture. The portion 12A of the border on the top panel 12, which is parallel to the adjacent edge 10A of the card 10, is free of adhesive to provide an opening O for inserting the film frame into the aperture.

The second point to be borne in mind is that the mechanism for inserting the film frame into the aperture is capable of feeding the frame up to edge 10A of the card so that the frame is only partially inserted. It is therefore necessary in order to complete the operation, to push the frame the remaining distance so that it can fall into place within the aperture compartment.

The third important point is that the frame inserted in the card must be that frame specifically identified on the card, and to avoid mismatching of the frame and card, it is necessary to visually examine the frame before insertion. This examination is also necessary in sectioning the frame to its exact dimensions.

The final and fourth point is that the steps of feeding, sectioning, frame insertion, and pushing must be carried out without scratching or mutilating the film, for any defect on the microfilm will be amplified in enlargement and projection.

*The machine*

Referring now to FIGS. 1, 2 and 3, showing the machine in accordance with the invention, in the film drive station the microfilm roll is carried on a reel 14 and drawn therefrom in the continuous web which is fed through an advancing mechanism constituted by a rotary drum 15 and a drive roller 16 mounted on a shaft 17 terminating in a hand knob 18. The film rides over the rotary drum, and by turning knob 18 the film web W is advanced by the drive roll 16 along a double-rail track 19 into a sectioning station. This station includes a film slicing mechanism including a pivoted cradle 20 supporting an inside or aft blade element 21 and an outside or fore blade 22. The blades are adapted to cut the web into individual frames of the desired length and at the same time to excise therefrom the junction areas or surplus chips J. The blades are actuated by an electrically energized solenoid 23 (shown in FIG. 2) operatively coupled to the cradle 20.

In order to view the film frame before insertion so as to align the leading and trailing edges of the frame with the fore and aft blades, and also to inspect the identifying data on the image to be sure it matches that on the aperture card, an optical viewer is provided at the sectioning station. The viewer, as best seen in FIG. 2, comprises a light source 24 provided with a condensing lens barrel 25 mounted on a carriage 26 which rides on a pair of rails 27 below the film web. The light beam emerging from the light source passes through the film into a projecting lens tube 28 disposed above the film web and supported by a bracket 29 affixed to carriage 26.

The carriage 26 may be shifted transversely relatively to the film web by means of a handle 30 attached thereto, whereby the optical system may be aligned laterally with respect to the film.

The light image projected through the projector tube 28 is cast on a mirror 31 and reflected thereby onto a viewing screen 32. Thus the frame image on the screen may be seen by the operator who controls the advance of the film. The film is centered by means of guide lines $G_1$ and $G_2$ contained on each frame, the guide lines being positioned by the operator to register with suitable centering lines drawn on the optical reader barrel.

At the card-loading station, the aperture card 10, as best seen in FIGS. 3 and 4, is positioned for loading on a platform 33 having a downwardly inclined surface, the platform being provided with a pair of slotted guide fingers 34A and 34B which receive the end corners of the card and hold it with the leading edge 10A at a level in horizontal alignment with the film web W in the sectioning station. When a sectioned frame is advanced, the forward end thereof strikes the inclined surface of the card, the film being deflected thereby so that as the advance continues the film frame enters the opening O between the card 10 and the upper panel 12 covering the aperture.

We shall assume for purposes of explanation, that frame $F_1$ has been sectioned exactly to size in the sectioning station and that it has been pushed partially into the aperture 11 of the card, as shown in FIG. 4, to the point where the trailing edge of the frame $F_1$ registers with the edge 10A of the card. The next frame $F_2$ now lies in the sectioning station, the distance between the cutting edges of blades 22 and 21 being exactly equal to the frame size. The portion of the uncut film web between the fore blade 22 and the trailing edge of the cut frame $F_1$ is constituted by the junction area J. Thus when the blades are actuated, the portion J is chipped off (note FIG. 6), and as shown in FIG. 1, falls into a tray 35 positioned below the platform 33.

The sectioning blades 21 and 22 are shown separately in FIG. 8, where it will be seen that blade 22 is a conventional slicing knife, whereas blade 21 is constituted by a block pivotally connected to one arm of cradle 20, the block having an aperture 21A therein whose width is sufficient to admit the web W. The upper edge 21B of the aperture is inclined relative to the frame and is chamfered, as best seen in FIG. 4, to form a knife edge.

The lower segment 21C of the blade is flat and lies parallel with the film web.

Blade 22 shears with respect to fixed platen 36 which lies below the web W, whereas blade edge 21B slices with respect to fixed platen 37 in the sectioning station. On the return motion, when the blades are raised, the lower edge 21C of blade 21 fills the gap between the film track 19 and the platen 37, thereby restoring track continuity to permit movement of the film. In the absence of this expedient, the film, which has a natural tendency to curl, might instead of moving into the sectioning station enter the gap and thereby fail to enter the sectioning station.

After the sectioned film frame is partially inserted in the aperature card 10, the card is transferred to the pusher device, which is constituted by a piece 38 secured to a downwardly extending extension 39 of platform 33. The piece 38 is relieved to form a slot 40, into which the card may be inserted, as shown in FIG. 5. The piece 38 terminates in a wedge-shaped finger 41 which engages the trailing edge of the individual frame, and as the card is inserted in slot 40, the finger 41 pushes the frame into the compartment, the border of the upper panel riding up the finger. A downwardly biased flat spring 42 is attached at one end to piece 38. The spring 42 engages the end of the inserted card to guide it into slot 40, such insertion being assured even if the card is buckled or warped. To avoid scratching the film, the spring is retracted by means of a pin 43 which extends into the slot and is secured to the spring. The pin is lifted when engaged by the inserted card, as shown in FIG. 6.

A microswitch 44 is mounted below platform extension 39 with its actuator wheel 45 passing through an opening in the extension into slot 40, the wheel 45 being engaged when the card is fully inserted in the slot. When switch 44 is actuated, it closes the circuit for solenoid 23 to actuate the blades in the sectioning station. Since the switch is otherwise inaccessible, it is not possible for an operator to thoughtlessly activate the knives by random contact with the switch, and thereby spoil film not yet properly aligned.

*Operation of the machine*

I shall now review the operation of the machine. For this purpose I shall start with a situation in which a frame say $F_1$, has been sectioned to size and initially rests between the two blades 21 and 22 in the sectioning station.

At the forward end of track 19 directly against the frame $F_1$ in the sectioning station, is the leading edge of the uncut film web W, which leading edge is that of the junction area J. This area is followed by frame $F_2$, another junction area, etc. A card 10 has been placed in platform 33 in readiness for loading, and the knives 21 and 22 are raised.

*Step 1.*—The operator turns knob 18 to advance the web W, the film passing over the knife segment 21C which fills the track gap, and pushing the leading edge of the cut frame $F_1$ into the aperture compartment. The operator continues turning the knob while observing the frame $F_2$ in the optical reader on screen 32, the operator advancing the film until the guide lines on frame $F_2$ are properly in register. At this point frame $F_2$ is in position for sectioning (as shown in FIG. 4). The leading edge of junction J engages the trailing edge of frame $F_1$ at the edge of card 10.

*Step 2.*—The partially loaded card is now withdrawn from platform 33 and transferred to the pusher device 38. When the card is inserted therein, the frame $F_1$ is pushed fully into the compartment, and at the same time, the microswitch is activated to operate the sectioning knives. This is the condition shown in FIG. 6.

This two-step cycle completes the sectioning, and loading and pushing operation for the first card, and now a second card is placed on the loading platform and the cycle is repeated for loading frame $F_2$. It will be obvious that very little skill is involved in this operation, and that an operator can load aperture cards correctly without difficulty and at high speed. The only error which can occur is where the operator fails to align the frame with reference to the guide lines and such error can be avoided by an optical safety device which is designed to interrupt the sectioning circuit should misalignment exist.

The entire operation, which has been described for reasons of simplicity, as manual, may be made fully automatic. This can be accomplished by an intermittent drive mechanism operating in conjunction with an optical sensor which will advance the film until the guide lines on a frame are aligned, as indicated by the sensor. Cards will be dispensed automatically and transferred to the pusher drive after each intermittent advance. To prevent mismatching, a comparison device may be provided to compare indicia on the projected image on each frame with indicia on the card, and to arrest the operation in the event of a mismatch.

While there has been shown a preferred sectioning and inserting machine in accordance with the invention, it will be appreciated that many changes and modifications may be made therein without, however, departing from the essential spirit of the invention as defined in the annexed claims.

What is claimed is:

1. A machine for sectioning microfilm having a series of frames joined together by junction areas into individual frames and for inserting each frame into an aperture card of the suspension type having an opening for admitting same, said machine comprising a sectioning station having spaced fore and aft blades, means conducting an uncut web of microfilm into said station to align the leading and trailing edges of a frame with said blades whereby the junction area adjacent the leading edge lies forwardly of the fore blade, an aperture card loading station to support a card with one end adjacent the fore blades of said sectioning station, means to actuate said blades whereby said frame is sectioned to size and the junction area is severed therefrom, means to advance said uncut web thereby to push the leading edge of the sectioned frame through the opening of said aperture card partially to insert same and to position the next frame into alignment with said blades, a pusher device having a finger to push the partially inserted frame into said aperture when a card is transferred from said loading station and inserted in said device, and switch means connected to said blade-actuating means and operatively coupled to said pusher device to render said actuating means operative when a card is inserted in said pusher device.

2. A machine for sectioning a microfilm having a series of frames joined together by junction areas into individual frames and for inserting each frame into an aperture card of the suspension type having an opening for admitting same: said machine comprising a sectioning station having spaced fore and aft blades, a solenoid for activating said blades, means for conducting a web of said film in a horizontal plane into said sectioning station to align the leading and trailing edges of a frame with said blades whereby the junction area adjacent the leading edges lies forwardly of the fore blade, an aperture card loading station including a platform for supporting an aperture card at a downwardly inclined position relative to the horizontal plane of the frame in the sectioning station with one end of the card in alignment with said plane, whereby when a sectioned frame is pushed by advancing the uncut web until the next frame is aligned in said sectioning station and the leading edge of the sectioned frame engages the edge of the inclined card and is deflected upwardly to slide through the opening of said card to cause said sectioned frame to become partially inserted in said aperture, a pusher device having a finger to push the partially inserted frame fully into said aperture when a card is transferred from said platform and inserted in said pusher device, and switch means connected to said blade-actuating means and operatively coupled to said pusher device to render said actuating means operative when a card is inserted in said pusher device.

3. A machine for sectioning a microfilm having a series of frames joined together by junction areas into individual frames and for inserting each frame into an aperture card of the suspension type having an opening for admitting same, said machine comprising a sectioning station having spaced fore and aft blades, a solenoid for activating said blades, a film drive station including a track for conducting the web of said film in a horizontal plane into said sectioning station to align the leading and trailing edges of a frame with said blades whereby the junction area adjacent the leading edges lies forwardly of the fore blade, and means to advance said web along said track; an aperture card loading station including a platform for supporting an aperture card at a downwardly inclined position relative to the horizontal plane of the frame in the sectioning station with one end of the card in alignment with said plane, whereby when a sectioned frame is pushed by advancing the uncut web until the next frame is aligned in said sectioning station the leading edge of the sectioned frame engages the edge of the inclined card and is deflected upwardly to slide through the opening of said card to cause said sectioned frame to become partially inserted in said aperture, and a pusher device having a finger to push the partially inserted frame fully into said aperture when a card is transferred from said platform and inserted in said pusher device, and switch means activated when said card is inserted in said pusher device to effect operation of said solenoid.

4. A machine as set forth in claim 3, wherein said pusher device is mounted on an extension of said platform and said switch means is mounted therebelow to prevent inadvertent actuation.

5. A machine for sectioning a microfilm having a series of frames joined together by junction areas into individual frames and for inserting each frame into an aperture card of the suspension type having an opening for admitting same, said machine comprising a sectioning station having spaced fore and aft blades, a solenoid for activating said blades, and optical means for inspecting a frame lying between said blades, a film drive station including a reel for supporting a roll of microfilm, a track for conducting the web of said film in a horizontal plane into said sectioning station to align the leading and trailing edges of a frame with said blades whereby the junction area adjacent the leading edges lies forwardly of the fore blade, and roller means to advance said web along said track; an aperture card loading station including a platform for supporting an aperture card at a downwardly inclined position relative to the horizontal plane of the frame in the sectioning station with one end of the card in alignment with said plane, whereby when a sectioned frame is pushed by advancing the uncut web until the next frame is aligned in said sectioning station the leading edge of the sectioned frame engages the edge of the inclined card and is deflected upwardly to slide through the opening of said card to cause said sectioned frame to become partially inserted in said aperture, and a pusher device having finger to push the partially inserted frame fully into said aperture when a card is transferred from said platform and inserted in said pusher device, and switch means activated when said card is inserted in said pusher device to effect operation of said solenoid.

6. A machine as set forth in claim 5, wherein said optical means comprises a light source mounted below said frame to project a mean therethrough, a projecting lens mounted above said frame to convey said beam to a viewing surface, and a movable carriage for supporting said source and said lens to adjust the transverse position relative to said frame.

References Cited by the Examiner

UNITED STATES PATENTS

| | | | |
|---|---|---|---|
| 2,010,997 | 8/1935 | Jurgensen | 53—23 XR |
| 2,892,295 | 6/1959 | McArthur | 53—123 |
| 2,937,483 | 5/1960 | Englestein | 53—123 |
| 3,019,579 | 2/1962 | Heckman | 53—123 |

TRAVIS S. McGEHEE, *Primary Examiner.*

A. E. FOURNIER, *Examiner.*